March 13, 1973  J. FRIEDRICHS ET AL  3,720,429
COUPLING
Filed March 8, 1971
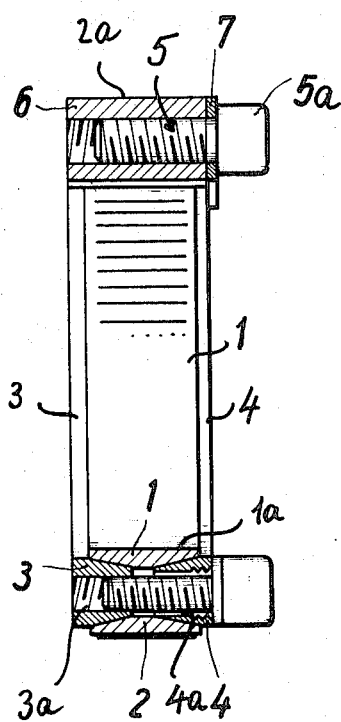
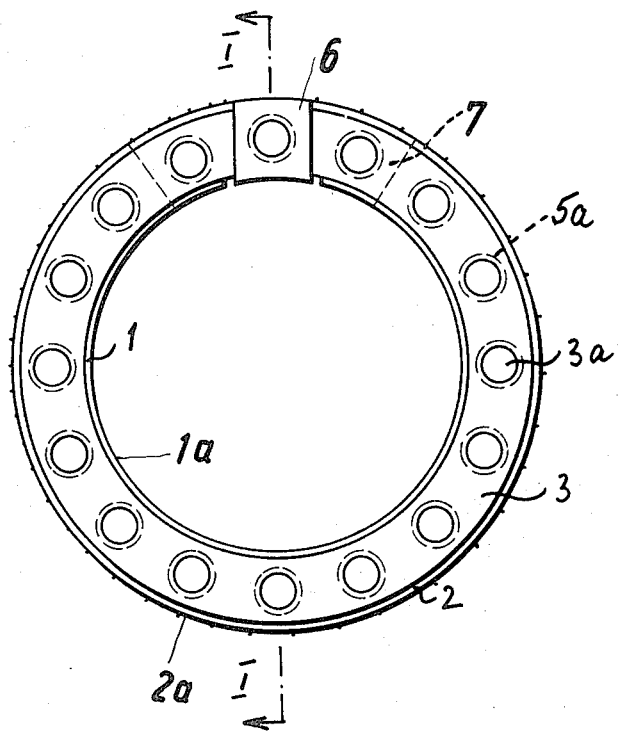
Inventor:
JOSEF FRIEDRICHS
KARL-HEINRICH SCHÖPFER
ULRICH KLÖREN

United States Patent Office 3,720,429
Patented Mar. 13, 1973

3,720,429
COUPLING
Josef Friedrichs, Krefeld-Bockum, Karl Heinrich Schropfer, Krefeld-Urdingen, and Ulrich Kloren, Krefeld, Germany, assignors to Ringfeder G.m.b.H., Krefeld-Urdingen, Germany
Filed Mar. 8, 1971, Ser. No. 121,927
Claims priority, application Germany, Mar. 9, 1970,
P 20 11 012.7
Int. Cl. F16d 1/06
U.S. Cl. 287—52.06                              8 Claims

ABSTRACT OF THE DISCLOSURE

An outer elastic split ring concentrically and with clearance surrounds an inner elastic split ring. The rings each have an axial gap and the axial gaps are radially aligned with one another. The rings defined with one another two axial clearances which taper in opposite axial directions inwardly towards one another and in each of which an intermediate split ring of wedge-shaped cross-section is received. These split rings can be drawn axially together by suitable bolts which connect them, to thereby radially expand the outer elastic split ring and radially contract the inner elastic split ring. In the radially aligned axial gaps of these four rings there is located a torque-transmitting member which at least substantially fills these gaps and is connected with the remainder of the coupling so as to be retained in its selected position relative thereto.

BACKGROUND OF THE INVENTION

The present invention relates generally to a coupling, and more particularly to a friction coupling. Still more specifically the present invention relates to a friction coupling for establishing frictional torque-transmitting engagement between a cylindrical member and an outer member which concentrically and with clearance surrounds the cylindrical member and between the two of which the coupling according to the present invention is located.

Couplings of this type are for instance used to mount a gear or the like on a shaft in a releasable manner, but have also other uses which will be self-evident to those skilled in the art. One such coupling is known from German Pat. 1,099,806 and has been found to be highly advantageous in practical use. It utilizes a pair of concentric rings which define between the outer surface of the inner ring and the inner surface of the outer ring two double-conical annular gaps, that is gaps of which one tapers in one axial direction and the other in the opposite axial direction of the two concentric rings. Wedge-shaped elements can be drawn into these gaps to thereby compress the inner ring radially into frictional engagement with a shaft or similar element which it surrounds, and at the same time to radially expand the outer ring into frictional engagement with the inner surface bounding a bore provided in an outer concentric member which is to be connected in torque transmitting relationship with the shaft.

Although, as just pointed out above, this known prior-art construction has been found to be highly advantageous, it has nevertheless been observed that when predetermined upper torque limits are exceeded, relative circumferential displacement of the components of the coupling will take place, that is that slippage is unavoidable when such limits are exceeded.

An attempt to avoid this problem is represented in the prior-art construction disclosed in German Pat. No. 1,110,476 in which all engaging surfaces of the respective components are provided with axially extending corrugations. The interengagement of these corrugations on the inner and outer ring is intended to prevent relative circumferential slippage of the rings under the influence of high torque. It has been found, however, that in this latter construction the meshing and cooperation of the corrugations on the inner and outer rings is not always uniform, leading to the danger of premature destruction or shearing-off of the teeth formed between the corrugations.

SUMMARY OF THE INVENTION

It is, accordingly, an object of the present invention to avoid the drawbacks of the prior art.

More particularly it is an object of the present invention to provide an improved coupling of the type under discussion in which relative slippage of the constituent components of the coupling under the influence of torque is avoided, and in which at the same time the danger of damage under the influence of high torque is also overcome.

A concomitant object of the invention is to provide such a coupling which is of relatively simple construction.

In pursuance of the above objects and of others which will become apparent hereafter one feature of the invention recites in a coupling which briefly stated comprises an inner and a concentric outer elastic split ring having respective radially aligned axial gaps. Wedging means is provided between these rings and operative for radially expanding the outer split ring and for radially contracting the inner split ring respectively. Further there is provided torque-transmitting means which is located in the radially aligned axial gaps and which is operative for directly transmitting torque from one to the other of these split rings.

According to a further concept of the invention the torque-transmitting means may advantageously be connected and maintained in its predetermined position relative to the constituent components of the coupling by means of a connecting element which is fast with the torque-transmitting means and connected with one or more of the other constituent components of the coupling.

Further increase in the effectiveness of the coupling according to the present invention can be achieved by providing the inner surface of the inner split ring and the outer surface of the outer split ring with corrugations which may extend axially or which may extend at an angle to the axes of the respective split rings. Of course both types of corrugations may be utilized in conjunction with one another if desired.

By resorting to the present invention we obtain a coupling of the type under discussion which provides in a simple maner and at low expense a frictional torque-transmitting connection and which not only permits the transmission of high torque but completely avoids the possibility of relative slippage of constituent components of the coupling under the influence of such high torque.

The novel features which are considered as characteristic for the invention are set forth in particular in the appended claims. The invention itself however both as to its construction and its method of operation together with additional objects and advantages thereof will be best understood from the following description of specific embodiments when read in connection with the accompanying drawings.

BRIEF DESCRIPTION OF THE DRAWING

FIG. 1 is a section taken on line I—I of FIG. 2; and
FIG. 2 is an end-elevational view of FIG. 1, looking towards the right-hand side of that figure.

DESCRIPTION OF THE PREFERRED EMBODIMENTS

Discussing now the drawing in detail it will be seen that in the illustrated exemplary coupling there is provided an inner split ring 1 and an outer split ring 2 which concentrically and with clearance surrounds the inner split ring 1. The term "split ring" is to be understood as meaning that these rings are not circumferentially complete, in that they each have an axially extending gap. The inner split ring 1 has a cylindrical inner surface 1a and an outer surface which diverges radially outwardly in double-conical configuration, that is it diverges radially outwardly from the opposite axial ends of the inner split ring 1 as illustrated in FIG. 1. The outer split ring 2, on the other hand, has a cylindrical outer surface 2a and an inner surface which is a mirror-reversed replica of the outer surface of the inner split ring 1. Thus, the outer surface of the ring 2 and the inner surface of the ring 2 define with one another two annular spaces each of which converges inwardly in direction from one axial end of the respective rings 1 and 2.

Located in these spaces are the wedge-cross section intermediate split rings 3 and 4. The essentially conical cross-sectional configuration of these intermediate split rings 3 and 4, which latter serve as wedging means, is clearly evident from FIG. 1 of the drawing and it will be seen that they are mirror-reversed in their cross-sectional configuration when inserted into the aforementioned annular spaces.

The intermediate split ring 3 is provided with a plurality of circumferentially spaced tapped bores 3a and the ring 4 is provided with similarly space bores 4a which are, however, not tapped but instead permit free passage therethrough of the stems of screws or bolts 5 which are thus threaded into the bores 3a each of which is aligned with one of the bores 4a. When the bolts 5 are tightened by engagement of their heads 5a with suitable tools, they will thus draw the rings 3 and 4 axially towards one another, whereby the elastically yieldable inner split ring 1 is inwardly compressed into tight engagement of its inner surface 1a with the outer surface of a shaft or similar member which it surrounds, whereas the outer split ring 2 is radially expanded into tight engagement of its outer surface 2a with the inner surface bounding a bore provided in an element which concentrically surrounds the shaft and with which the shaft is to be connected in torque-transmitting relationship. It is not thought necessary to show a shaft and a concentric element, or in fact similar elements, because the utilization of the coupling disclosed herein will be entirely clear without such a showing, and because reference may be had—should any doubt exist—to the afor mentioned German Patents for such showing.

The axial gap in the inner split ring 1 must be slightly greater in circumferential direction than those in the rings 2, 3 and 4, because in response to tightening of the bolts 5 the ring 1 undergoes a circumferential contraction, and because it could not do so if the circumferential dimension of its axial gap were the same as those of the gaps in the rings 2, 3 and 4 because the opposite circumferenital edges bounding the gap in the inner split ring 1 would abut against the torque-transmitting member 6 located in these radially aligned gaps before such construction could take place if the circumferential dimension of the gap in the ring 1 were not somewhat larger than those of the gaps in the rings 2, 3 and 4.

The configuration of the torque-transmitting members will be evident from a comparison of FIGS. 1 and 2. As just point out, the axial gaps in all of the rings 1–4 are radially aligned with one another and the member 6 is located in the thus aligned gaps so that the circumferential edges bounding the respective gaps abut or at least nearly abut the member 6 at opposite lateral sides thereof. Advantageously, and as illustrated in the exemplary embodiment, a connecting member 7 of sheet metal or the like will be secured to the member 6 by means of one of the bolts 5 which is threaded into a tapped bore provided for this purpose in the member 6 and through a corresponding opening in the member 7. End portions of the member 7 overlie an axial end face of one of the rings 3 or 4 (here of the ring 4) at opposite sides of the axial gap therein, and are provided with apertures registering with the respective bores 4a so that the member 7 is connected with the ring 4 by the bolts 5 passing through the apertures and the bores 4a to be threaded into the bores 3a. In this manner the member 6 is positioned and maintained against displacement with reference to the constituent components of the novel coupling. It will be seen that the radially inner and outer surfaces of the member 6 are flush with the inner circumferential surface 1a of the inner ring 1 and with the outer circumferential surface 2a of the outer ring 2, respectively.

The surfaces 1a and 2a are advantageously provided with serrations which may extend in axial direction of the respective surfaces, which may be inclined to the axis of the respective surfaces, or which may have both orientations with some of the corrugations extending axially and with others being inclined to them. The reason for these corrugations has previously been discussed.

The rings 1 and 2 are preferably of spring steel or the like but other materials may also be suitable.

In the absence of the member 6, that is if the inner and outer rings 1 and 2, as well as the rings 3 and 4 were circumferentially complete, excess torque will result in circumferential slippage of the rings with reference to one another, meaning that first the inner surface 1A of the ring 1 could slip with respect to the associated surface of a shaft engaged by it, and the rings 1 and 2 could slip with reference to one another and to the rings 3 and 4.

This latter slippage is avoided by the presence of the member 6 because the edges bounding the axial gaps in the rings 1 and 2 now abut against the lateral edges of the member 6 so that a torque is no longer transmitted by friction on the aforementioned contact faces, but instead is directly transmitted from the outer ring 2 via the member 6 to the inner ring 1.

When corrugations are provided on the surfaces 1a and 2a, they (in conjunction with member 6) assure that the transmittable torque is independent of the frictional force and determined only by the transmittal characteristic of the corrugations themselves.

By resorting to the present invention it is thus clear that there is obtained a coupling which has the desired advantages outlined earlier, and which avoids the problems which have heretofore been encountered.

It will be understood that each of the elements described above, or two or more together, may also find a useful application in other types of constructions differing from the types described above.

While the invention has been illustrated and described as embodied in a coupling, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended claims:

1. A coupling, comprising an inner and a concentric outer elastic split ring having respective radially aligned axial gaps; wedging means including at least one intermediate split ring located between said inner and outer rings and having an additional axial gap radially aligned with said axial gaps of said inner and outer rings, said wedging means being operative for radially expanding and contracting said outer and inner split ring, respectively; torque-transmitting means including a torque-transmitting member extending axially of said rings and located in said radially aligned gaps at least substantially filling the same in circumferential direction of said rings; and connecting means connecting said torque-transmitting member with at least said one intermediate split ring.

2. A coupling as defined in claim 1, said inner split ring having a cylindrical inner surface and an outer surface which tapers radially outwardly from opposite axial ends of said inner split ring; said outer split ring having a cylindrical outer surface and an inner surface which tapers radially outwardly from opposite axial ends of said outer split ring and defines with said outer surface of said inner split ring a pair of annular spaces which taper in mutually opposite axial directions; and wherein said wedging means comprises two intermediate split rings of wedge-shaped cross-section each at least partially received in one of said spaces and each having an additional axial gap radially aligned with said axial gaps of said inner and outer split rings.

3. A coupling as defined in claim 2, said wedging means further comprising a plurality of circumferentially spaced tensioning elements each extending axially of and connecting said intermediate split rings, being operative for drawing the same axially towards one another with concomitant radial expansion of said outer split ring and radial contraction of said inner split ring.

4. A coupling as defined in claim 1, said connecting means comprising a connecting member having a center portion fast with said torque-transmitting member and two end portions each overlying parts of an axial end face of said one intermediate split ring at opposite circumferential sides of the axial gap therein.

5. A coupling as defined in claim 2, and further comprising friction-enhancing means on said inner surface of said inner split ring and on said outer surface of said outer split ring, respectively.

6. A coupling as defined in claim 5, wherein said friction-enhancing means comprises serrations extending axially of the respective inner and outer split ring.

7. A coupling as defined in claim 4, wherein said inner and outer split rings define between one another an annular gap composed of two axially adjacent annular spaces which taper towards one another in mutually opposite axial directions; further comprising an additional intermediate split ring, each of said intermediate split rings having a wedge-shaped cross-section and being at least partially received in one of said annular spaces, said end portions of said connecting member and one of said intermediate split rings having axially aligned smooth bores, and the other of said intermediate split rings having tapped bores each of which is aligned with one of said smooth bores; and further comprising bolt members extending through said smooth bores and threaded into the respective tapped bores.

8. A coupling, comprising an inner and a concentric outer elastic split ring having respective radially aligned axial gaps; wedging means including at least one intermediate split ring located between said inner and outer rings and having an additional axial gap radially aligned with said axial gaps of said inner and outer rings, said wedging means being operative for radially expanding and contracting said outer and inner split ring, respectively; torque-transmitting means including a torque-transmitting member extending axially of said rings and located in said radially aligned gaps at least substantially filling the same in circumferential direction of said rings; and friction-enhancing serrations provided on the outer surface of said outer split ring and the inner surface of said inner split ring, respectively, and extending at angles to the axes of said inner and outer split rings.

References Cited
UNITED STATES PATENTS
3,501,183   3/1970   Stratienko _____ 287—52.06
2,524,027   10/1950   Blackmarr _____ 287—52.06

OTHER REFERENCES
German printed application 1,099,806, Peter, February 1961 (1 sht. dwg., 2 pp. spec.).

German printed application 1,110,476, Peter, July 1961 (1 sht. dwg., 2 pp. spec.).

ANDREW V. KUNDRAT, Primary Examiner